(12) United States Patent
Habel et al.

(10) Patent No.: US 11,577,330 B2
(45) Date of Patent: Feb. 14, 2023

(54) MINIMUM QUANTITY LUBRICATION THREAD TAP

(71) Applicant: Ford Motor Company, Dearborn, MI (US)

(72) Inventors: Michael Habel, Ann Arbor, MI (US); Ethan Hughey, Royal Oak, MI (US); Shibu Philipose, Canton, MI (US); David Stephenson, Detroit, MI (US)

(73) Assignee: Ford Motor Company, Dearborn, MI (US)

( * ) Notice: Subject to any disclaimer, the term of this patent is extended or adjusted under 35 U.S.C. 154(b) by 23 days.

(21) Appl. No.: 16/994,890

(22) Filed: Aug. 17, 2020

(65) Prior Publication Data

US 2020/0376577 A1 Dec. 3, 2020

Related U.S. Application Data

(62) Division of application No. 16/107,116, filed on Aug. 21, 2018, now Pat. No. 10,773,323.

(51) Int. Cl.
*B23G 5/06* (2006.01)
*B23G 5/00* (2006.01)
*B23Q 11/10* (2006.01)

(52) U.S. Cl.
CPC .............. *B23G 5/005* (2013.01); *B23G 5/06* (2013.01); *B23G 2240/12* (2013.01); *B23Q 11/1046* (2013.01)

(58) Field of Classification Search
CPC ...... B23G 5/005; B23G 5/06; B23G 2200/42; B23G 2240/12; B23G 7/02; B23Q 11/10;
(Continued)

(56) References Cited

U.S. PATENT DOCUMENTS 3,791,660 A * 2/1974 Bostley ............... B23Q 1/0036
279/20
4,704,055 A * 11/1987 Guhring .................. B23B 51/06
408/230
(Continued)

FOREIGN PATENT DOCUMENTS

DE 102009038173 A1 * 3/2011 ............... B23G 5/06
EP 0240765 A2 * 10/1987 ............. B23B 51/06
EP 0760270 A1 * 3/1997 ............. B23G 5/005

OTHER PUBLICATIONS

Translation DE102009038173 A1, Guehring, Mar. 2011.*
Translation EP 0760270 A1, Reime, Mar. 1997.*

*Primary Examiner* — Edward T Tolan
(74) *Attorney, Agent, or Firm* — Burris Law, PLLC (57) ABSTRACT

A thread tap includes a shaft and teeth. The shaft includes helical passages from the threading end to the base end of the shaft. Each passage opens through an aperture in the threading end. A second tap includes a cap and the shaft includes an axially extending passage. The cap is coupled to the threading end and at least partially defines apertures in fluid communication with the passage and the exterior of the tap. A third tap includes teeth spaced apart by a plurality of linear flutes. The shaft includes a central passage and a plurality of flute passages. Each flute passage extends radially outward from a common location in the central passage to a corresponding one of the flutes. The central passage is closed to a terminal end of the threading end.

16 Claims, 4 Drawing Sheets

(58) Field of Classification Search
CPC ............ B23Q 11/1046; B23C 2250/12; B23B 51/068; B23B 51/042; B23B 51/06; B23B 51/0686
See application file for complete search history.

(56) References Cited

U.S. PATENT DOCUMENTS

| | | | | |
|---|---|---|---|---|
| 4,762,444 | A * | 8/1988 | Mena .................... | B23G 5/005 408/222 |
| 4,881,431 | A * | 11/1989 | Bieneck ................. | B21C 25/02 76/108.6 |
| 5,435,786 | A * | 7/1995 | Murphy ................. | B23G 5/005 470/25 |
| 6,045,301 | A * | 4/2000 | Kammermeier ........ | B23B 51/06 408/230 |
| 8,496,534 | B2 * | 7/2013 | Osawa ................... | B23G 5/20 408/222 |
| 8,794,879 | B2 * | 8/2014 | Durst ..................... | B23G 5/18 407/119 |
| 8,998,543 | B2 * | 4/2015 | Schwenck .............. | B23B 51/06 408/59 |
| 9,682,435 | B2 * | 6/2017 | Yan ........................ | B23G 5/005 |
| 9,795,457 | B2 * | 10/2017 | Friedrichs .............. | B23B 51/06 |
| 10,117,723 | B2 * | 11/2018 | Friedrichs .............. | B23B 51/06 |
| 2011/0201434 | A1 * | 8/2011 | Edelmann .............. | B23G 7/02 470/198 |
| 2016/0059334 | A1 * | 3/2016 | Yan ........................ | B23G 5/005 408/222 |
| 2019/0176255 | A1 * | 6/2019 | Kopton .................. | B23G 5/20 |
| 2021/0001438 | A1 * | 1/2021 | Royer .................... | B22F 7/062 |
| 2021/0138561 | A1 * | 5/2021 | Sterling ................. | B23B 51/06 |

* cited by examiner

MINIMUM QUANTITY LUBRICATION THREAD TAP

CROSS-REFERENCE TO RELATED APPLICATIONS

This application is a divisional application of U.S. application Ser. No. 16/107,116 filed on Aug. 21, 2018. The disclosure of the above application is incorporated herein by reference in its entirety.

FIELD

The present disclosure relates to minimum quantity lubrication thread tap.

BACKGROUND

The statements in this section merely provide background information related to the present disclosure and may not constitute prior art.

Conventional thread taps use high volume flow of a liquid lubricant over the cutting edges of the tool. Some thread taps have an internal passage that provide this liquid lubricant to each cutting edge. Since the liquid lubricant is essentially an incompressible fluid, flow from the passage to each cutting edge remains substantially based on the pressure of the liquid supplied to the tool.

In contrast, minimum quantity lubrication ("MQL") machining uses lubrication supplied to the cutting edges of a tool through a lean air-oil mist, rather than through the high volume liquid-based emulsion in conventional thread tapping. The ratio of air to oil in the air-oil mist is typically very high and the lubricant mist acts as a compressible fluid (unlike the incompressible liquid lubricant of conventional thread tapping). Taps designed for liquid lubricant flow through internal passages suffer from excessive air compression and backpressure when used with the air-oil mist of MQL machining. This can result in wasted lubricant and excess wear on the tap.

The present disclosure provides a thread tap having a more balanced lubrication flow for MQL thread tapping that overcomes the problems of typical thread taps when used for MQL tapping.

SUMMARY

In one form, a thread tap includes a shaft and a plurality of teeth disposed at a threading end of the shaft. The shaft includes a plurality of passages that extend helically from the threading end to a base end of the shaft opposite the threading end. Each passage is open through a corresponding aperture defined by the threading end.

According to a further form, the corresponding apertures are equally spaced apart in a circumferential direction about a central axis of the shaft.

According to a further form, the corresponding apertures are defined by a terminal end face of the threading end or a tapered end face of the threading end.

According to a further form, the corresponding apertures are configured to release lubricant in opposite directions from the terminal end face of the threading end toward the teeth.

According to a further form, the base end of the shaft includes a manifold chamber in fluid communication with each passage.

According to a further form, a helical pitch of the passages is a different pitch than a thread pitch of the teeth.

According to a further form, a helical diameter of the passages is less than a minimum diameter of the teeth.

According to a further form, sets of the teeth are spaced apart by flutes defined by the shaft.

According to a further form, the flutes extend linearly along the shaft.

According to a further form, the passages are radially inward of the flutes.

In another form, a thread tap includes a shaft, a cap, and a plurality of teeth disposed at a threading end of the shaft. The shaft includes an axially extending passage open through the threading end. The cap is coupled to the threading end and at least partially defines a plurality of apertures in fluid communication with the passage and an exterior of the thread tap.

According to a further form, the cap includes a deflecting body and a plurality of supports. The supports couple the deflecting body to the threading end. The apertures are disposed between the supports.

According to a further form, the plurality of apertures are equally spaced apart in a circumferential direction about a central axis of the shaft.

According to a further form, the cap includes a deflecting body coaxial with a central axis of the shaft. The deflecting body narrows in an axial direction toward the passage to direct fluid from the passage radially outward.

According to a further form, the cap is mounted to the shaft.

According to a further form, the cap is mounted to a terminal end of the threading end by epoxy, brazing, welding, or press-fit contact.

In another form, a thread tap includes a shaft and teeth spaced apart by a plurality of flutes that extend linearly along a threading end of the shaft. The shaft includes a central passage and a plurality of flute passages. Each flute passage extends radially outward from a common location in the central passage to a corresponding one of the flutes. The central passage is closed to a terminal end of the threading end.

According to a further form, each flute passage is open to the corresponding flute at a tapered portion of the threading end.

According to a further form, the plurality of flutes consists of a first flute and a second flute. The plurality of flute passages consists of a first flute passage and a second flute passage. The first and second flutes extend linearly along the shaft.

According to a further form, the first flute passage has a diameter d1, the second flute passage has a diameter d2, and the central passage has a diameter Dc, and $d_1 = d_2 = D_c/\sqrt{2}$.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
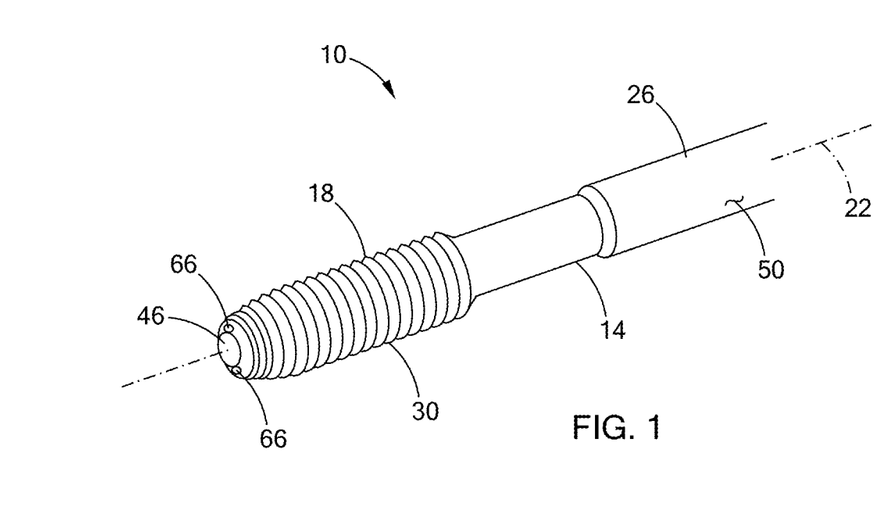
FIG. 1 is a perspective view of a thread tap in accordance with the teachings of the present disclosure.

With reference to FIG. 1, a thread tap 10 of a first construction is illustrated. The tap 10 includes a shaft 14 and a plurality of external teeth 18. The shaft 14 is disposed coaxially about a central axis 22 and has a holding portion 26 and a tapping portion 30 that is axially opposite the holding portion 26. The shaft 14 defines a plurality of passages 34, 38 that extend in a helical manner about the central axis 22 through the holding portion 26 and the tapping portion 30. In the example provided, there are two passages 34, 38 that maintain separate helical paths through the holding portion 26 and the tapping portion 30, i.e., from a first end 42 of the shaft 14 to a second end 46 of the shaft 14.

Figure 2:
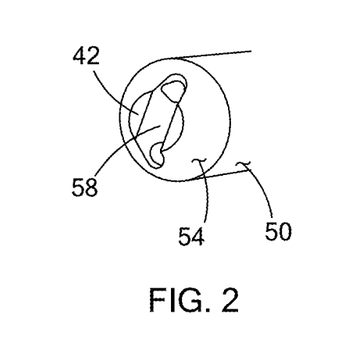
FIG. 2 is perspective view of a base end of the thread tap of FIG. 1.

The holding portion 26 is configured to be gripped by a tapping tool holder (not shown) that can rotate the tap 10 about the central axis 22. In the example provided, the holding portion 26 has a smooth cylindrical outer surface 50 and a frusto-conical surface 54 that extends axially from the cylindrical outer surface 50. The frusto-conical surface 54 narrows in the axial direction toward the first end 42 (i.e., the frusto-conical surface narrows with increased distance from the tapping portion 30). With additional reference to FIG. 2, the first end 42 defines a manifold chamber 58 open through the tip of the frusto-conical surface 54 and in fluid communication with the passages 34, 38. The frusto-conical surface 54 and/or the cylindrical outer surface 50 are configured to seal with the tool holder (not shown) and the tool holder is configured to supply lubrication in the form of an air-oil mist (i.e., minimum quantity lubrication, "MQL") to the passages 34, 38 via the manifold chamber 58.

In the example provided, the tapping portion 30 has a smaller outer diameter than the holding portion 26. The teeth 18 are external teeth disposed about the tapping portion 30 proximate to the second end 46. The teeth 18 extend helically about the axis 22. In the example provided, the teeth 18 form a single start thread that winds helically about the tapping portion 30. The teeth 18 have a minor diameter defined by valleys between threadforms and a major diameter defined by peaks of each threadform.

Figure 3:
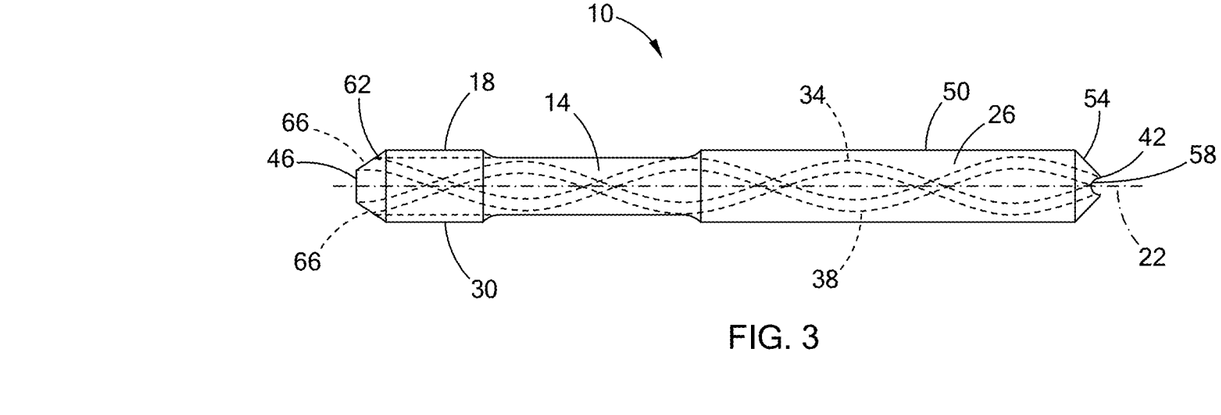
FIG. 3 is a side plan view of the thread tap of FIG. 1.

With additional reference to FIG. 3, the tapping portion 30 can have a tapered or chamfered region 62 generally between the teeth 18 and the second end 46. In the example provided, the first few teeth 18 proximate to the second end 46 can also be within the chamfered region 62 such that the first few teeth 18 are chamfered threadforms. The chamfered region 62 narrows toward the second end 46. In the example provided, the chamfered region 62 narrows to a diameter that is less than the minor diameter of the teeth 18.

The passages 34, 38 have a pitch (i.e., the distance along the axis 22 that the helix takes to make one complete revolution about the axis 22) that is different than the pitch of the teeth 18. In the example provided, the passages 34, 38 have a helical pitch that is significantly less than the pitch of the teeth 18, such as a helix pitch of between 15° and 30°, though other configurations can be used. In the example provided, the passages 34, 38 have a constant helix radius (i.e., a constant helix diameter). In other words, the passages 34, 38 maintain a constant distance apart from the axis 22 throughout the shaft 14. The helix diameter is less than the minor diameter of the teeth 18 such that the passages 34, 38 remain completely radially inward of the teeth 18. In the example provided, the minor diameter of the teeth 18 is between 5 mm and 14 mm, though other sizes can be used depending on the size of the hole (not shown) to be tapped and the size of threads desired.

The passages 34, 38 can be equally spaced apart in the circumferential direction. In the example provided, the two passages 34, 38 are diametrically opposite each other. Each passage 34, 38 is open through the tapping portion 30 at a corresponding aperture 66. In the example provided, the chamfered region 62 narrows to a diameter that is less than the helix diameter so that the apertures 66 are open through the chamfered region 62 to provide lubrication at the chamfered region 62. In the example provided, the apertures 66 are diametrically opposite each other so that rotation of the tap 10 causes the lubrication to be expelled from the passages 34, 38 in opposite directions radially outward from the end face toward the teeth 18.

In an alternative configuration, not specifically shown, the chamfered region 62 does not narrow less than the helix diameter and the apertures 66 are open through the terminal end face of the second end 46. In this alternative example, rotation of the tap 10 causes the lubrication to be expelled from the passages 34, 38 in opposite directions radially outward toward the teeth 18.

Returning to the example provided, the tap 10 is a forming tap and does not include any flutes or leading cutting edges. While not specifically shown, the forming tap can include oil grooves extending axially along the shaft 14 through the peaks of the teeth 18, i.e., locations where the threadforms of the teeth 18 have been truncated without forming cutting edges. The apertures 66 can be aligned in the circumferential direction with corresponding ones of the oil grooves (not shown) to emit lubrication directly or indirectly to the grooves (not shown).

In an alternative configuration, not specifically shown, the tap 10 can be a cutting tap including a plurality of flutes and leading cutting edges at each flute. In this alternative configuration, the apertures 66 can be aligned in the circumferential direction with corresponding ones of the flutes (not shown) to emit lubrication directly or indirectly to the flutes (not shown).

Figure 4:
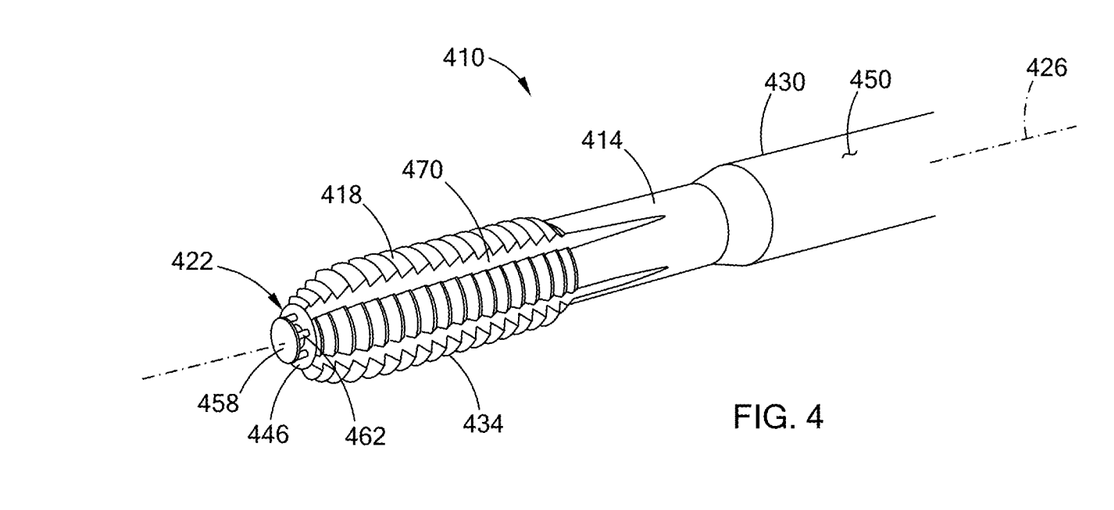
FIG. 4 is a perspective view of a thread tap of a second construction in accordance with the teachings of the present disclosure, illustrating a deflecting cap.
Figure 5:
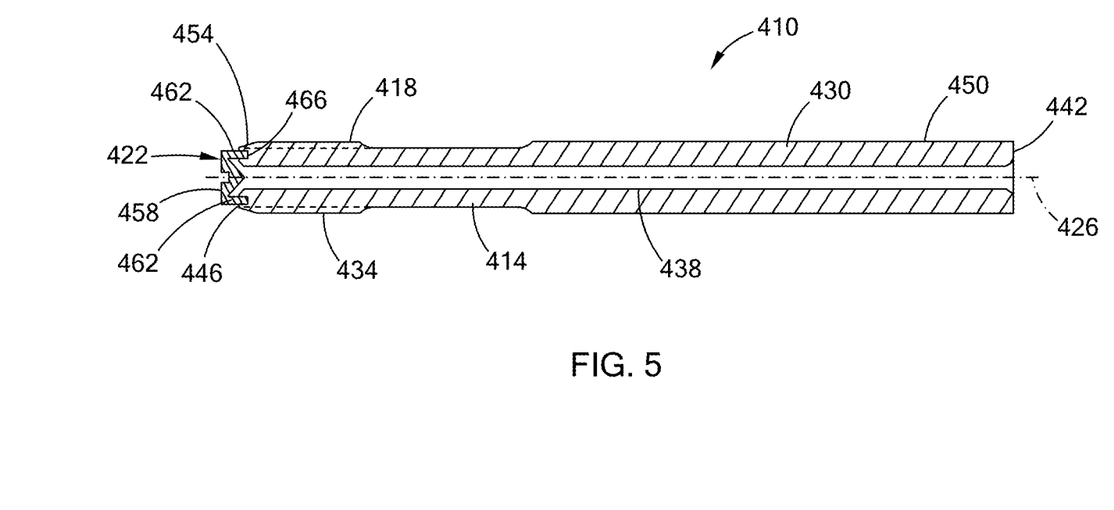
FIG. 5 is a cross-sectional view of the thread tap of FIG. 4.
Figure 6:
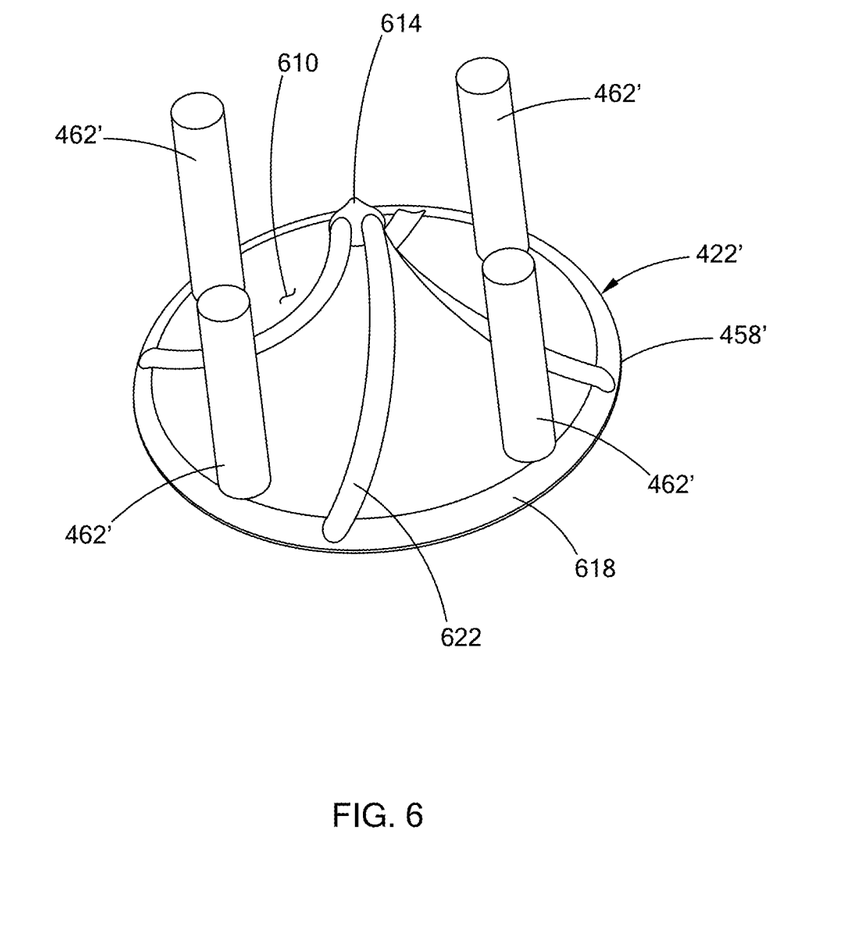
FIG. 6 is a perspective view of a deflecting cap of a second construction in accordance with the teachings of the present disclosure.

With reference to FIGS. 4-6, a thread tap 410 of a second construction is illustrated. The tap 410 includes a shaft 414, a plurality of external teeth 418, and a cap 422. The shaft 414 is disposed coaxially about a central axis 426 and has a holding portion 430 and a tapping portion 434 that is axially opposite the holding portion 430. The shaft 414 defines a central passage or bore 438 that extends coaxially along the central axis 426 through the holding portion 430 and the tapping portion 434. The bore 438 is open through a first end 442 of the shaft 414 and extends fully through the shaft 414 to be open through an opposite second end 446.

The holding portion 430 is configured to be gripped by a tapping tool holder (not shown) that can rotate the tap 410 about the central axis 426. In the example provided, the holding portion 430 has a smooth cylindrical outer surface 450. In the example provided, the outer surface 450 is configured to seal with the tool holder (not shown) and the tool holder is configured to supply lubrication in the form of an air-oil mist (i.e., minimum quantity lubrication, "MQL") to the bore 438 through the first end 442.

In the example provided, the tapping portion 434 has a smaller outer diameter than the holding portion 430. The teeth 418 are external teeth disposed about the tapping portion 434 proximate to the second end 446. The teeth 418 extend helically about the axis 426. In the example provided, the teeth 418 form a single start thread that winds helically about the tapping portion 434. The teeth 418 have a minor diameter defined by valleys between threadforms and a major diameter defined by peaks of each threadform.

The tapping portion 434 can have a tapered or chamfered region 454 generally between the teeth 418 and the second end 446. In the example provided, the first few teeth 418 proximate to the second end 446 can also be within the chamfered region 454 such that the first few teeth 418 are chamfered threadforms. The chamfered region 454 narrows toward the second end 446. In one configuration, the chamfered region 454 can narrow to a diameter that can be less than the minor diameter of the teeth 418, though other configurations can be used.

The cap 422 is fixedly (i.e., non-movably) mounted to the second end 446 and is generally configured to deflect MQL flow from the bore 438 radially outward toward the teeth 418. In the example provided, the cap 422 includes a deflector body 458 and a plurality of supports 462. The deflector body 458 has a shape configured to direct lubrication flow from the bore 438 radially outward. In the example provided, the deflector body 458 has a generally conical shape coaxial with the axis 426. The base of the conical deflector body 458 is spaced axially apart from the second end 446 and the deflector body 458 narrows toward its tip proximate to the second end 446. In the example provided, the tip of the conical deflector body 458 extends within the bore 438, though other configurations can be used. While illustrated in FIG. 5 as a generally conical shape, other shapes can be used, e.g., a pyramid, a frustoconical shape, or a curved surface (e.g., as shown in FIG. 6).

The supports 462 are radially outward of the bore 438 and extend from the base of the deflector body 458 in the axial direction toward the second end 446. The supports are fixedly attached to the tapping portion 434. The supports 462 are spaced apart in the circumferential direction to define apertures or openings between the supports 462. In the example provided, there are four supports 462 equally spaced apart to define four openings, though other numbers of supports 462 can be used. In the example provided, the second end 446 defines four mounting recesses 466 that correspond to the four supports 462. Each recess 466 is open through the terminal face of the second end 446 and disposed radially outward of the bore 438. Each support 462 is received in a corresponding one of the recesses 466 and fixed therein. In the example provided, the supports 462 are press-fit in the recesses 466.

In an alternative configuration, not specifically shown, the supports can be adhered within the recesses 466, such as with an epoxy for example. In another alternative configuration, not specifically shown, the supports 462 can be welded or brazed in the recesses 466 or to the second end 446 absent the recesses 466.

Returning to FIGS. 4 and 5, the cap 422 is disposed entirely radially inward of the chamfered region 454 and radially inward of the minor diameter of the teeth 418. In the example provided, the cap 422 can be made of a material that is softer than the shaft 414 since the cap 422 does not contact the workpiece (not shown) during tapping. For example, the cap 422 may be made from plastic, powder metal, or low carbon steel. Accordingly, the cap 422 can be made using an inexpensive process, such as injection molding, blanking/forging, or sintering for example.

In the example provided, the tap 410 is a forming tap and does not include any flutes or leading cutting edges. In the example provided, the forming tap can include oil grooves 470 extending axially along the shaft 414 through the peaks of the teeth 418, i.e., locations where the threadforms of the teeth 418 have been truncated without forming cutting edges. The openings between the supports 462 can be aligned in the circumferential direction with corresponding ones of the oil grooves 470 to emit lubrication toward the grooves 470. In an alternative configuration, the tap 410 can be configured without the oil grooves 470.

In an alternative configuration, not specifically shown, the tap 410 can be a cutting tap including a plurality of flutes and leading cutting edges at each flute. In this alternative configuration, the openings between the supports 462 can be aligned in the circumferential direction with corresponding ones of the flutes (not shown) to emit lubrication directly or indirectly to the flutes (not shown).

With reference to FIG. 6, an alternative configuration of the cap is illustrated and indicated with reference numeral 422'. The cap 422' is similar to the cap 422 (FIGS. 4 and 5), except as otherwise shown or described herein. Elements denoted by primed reference numerals are similar to the elements shown and described in FIGS. 4 and 5 having similar non-primed numerals, except as otherwise shown or described herein.

Instead of a conical shape, the deflector body 458' has a curved, concave surface 610 that directs the lubrication radially outward. The concave surface 610 is axisymmetrically curved with a central peak 614 at the axis 426 and a variable radius of curvature that increases with radial distance from the axis 426 to a base 618. In the example provided, the curvature is generally parabolic in shape, though other configurations can be used. In one configuration, the radius of curvature at the center is between 2 and 4 times the tap major diameter and increases by roughly a factor of two or the major diameter with increased radial distance from the axis 426. In the example provided, the deflector body 458' can optionally have directing features such as recesses, valleys or channels 622 configured to improve MQL delivery radially outward to the teeth 418 (FIGS. 4 and 5), especially when the tap 410 rotates at high speeds (i.e., high revolutions per minute). The channels 622 can cause the deflector body 458' to act as a centrifuge or centrifugal pump, e.g., increasing centrifugal force acting on the MQL mixture to whip the MQL mixture radially outward toward the teeth 418 (FIGS. 4 and 5). The channels 622 can optionally spiral about the axis 426 depending on the rotational direction of the teeth 418 (FIGS. 4 and 5) and thus the rotational direction of the tap 410 (FIGS. 4 and 5). In the example provided, the channels spiral in a clockwise manner from the central peak 614 to the base 618. In an alternative configuration, not specifically shown, the channels 622 can spiral in a counter-clockwise direction from the peak 614 to the base 618. In another alternative configuration, not specifically shown, protrusions (e.g., fins) can protrude from the concave surface 610 to direct the flow. The protrusions (not shown) can spiral about the axis 426 similar to the channels 622.

Figure 7:
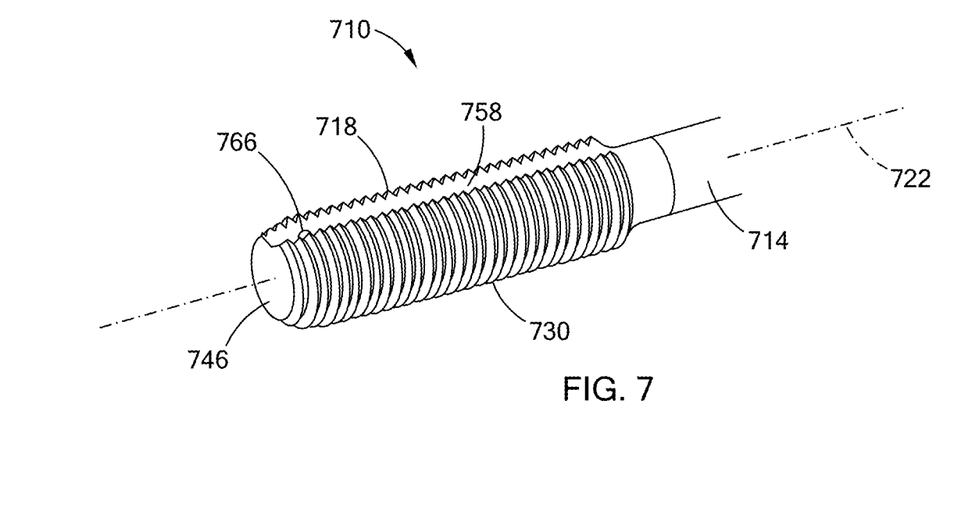
FIG. 7 is perspective view of a thread tap of a third construction in accordance with the teachings of the present disclosure.
Figure 8:
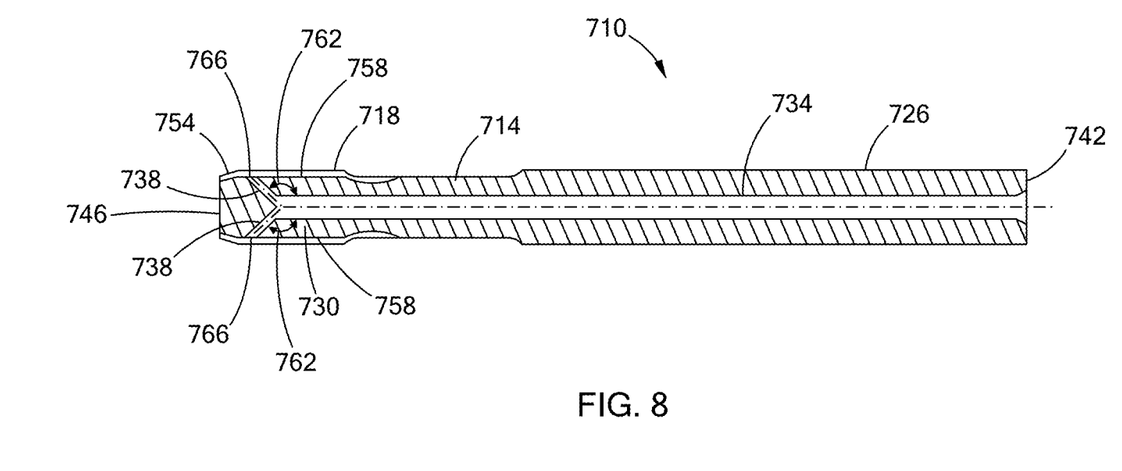
FIG. 8 is a cross-sectional view of the thread tap of FIG. 7.

With reference to FIGS. 7 and 8, a thread tap 710 of a third construction is illustrated. The tap 710 includes a shaft 714 and a plurality of external teeth 718. The shaft 714 is disposed coaxially about a central axis 722 and has a holding portion 726 and a tapping portion 730 that is opposite the holding portion 726. The shaft 714 defines a central passage or bore 734 and a plurality of branch passages or bores 738. The central bore 734 extends coaxially along the central axis 722 through the holding portion 726 and a region of the tapping portion 730. The bore 734 is open through a first end 742 of the shaft 714 at the holding portion 726 and extends through the shaft 714 toward an opposite second end 746, but is not open through the second end 746.

The holding portion 726 is configured to be gripped by a tapping tool holder (not shown) that can rotate the tap 710 about the central axis 722. In the example provided, the holding portion 726 has a smooth cylindrical outer surface 750. In the example provided, the outer surface 750 is configured to seal with the tool holder (not shown) and the tool holder is configured to supply lubrication in the form of an air-oil mist (i.e., minimum quantity lubrication, "MQL") to the bore 734 through the first end 742.

In the example provided, the tapping portion 730 has a smaller outer diameter than the holding portion 726. The teeth 718 are external teeth disposed about the tapping portion 730 proximate to the second end 746. The teeth 718 extend helically about the axis 722. In the example provided, the teeth 718 form a single start thread that winds helically about the tapping portion 730. The teeth 718 have a minor diameter defined by valleys between threadforms and a major diameter defined by peaks of each threadform.

The tapping portion 730 can have a tapered or chamfered region 754 generally between the teeth 718 and the second end 746. In the example provided, the first few teeth 718 proximate to the second end 746 can also be within the chamfered region 754 such that the first few teeth 718 are chamfered threadforms. The chamfered region 754 narrows toward the second end 746. In one configuration, the chamfered region 754 can narrow to a diameter that can be less than the minor diameter of the teeth 718, though other configurations can be used.

In the example provided the tapping portion 730 includes a pair of grooves or channels 758 that are diametrically opposite each other and open in the direction radially outward relative to the axis 722. The channels 758 extend linearly from the second end 746, toward the first end 742, through the teeth 718, and terminate axially between the teeth 718 and the holding portion 726. In the example provided, the channels 758 have troughs that are radially inward of the minor diameter of the teeth 718, though other configurations can be used. In the example provided, the tap 710 is a forming tap and the channels 758 are oil grooves, such that the teeth 718 do not have cutting edges at their interface with the channels 758. In an alternative configuration, not specifically shown, the tap 710 can be a cutting tap and the channels 758 can be flutes such that the teeth 718 have leading cutting edges at each flute.

The branch bores 738 extend from a terminal end of the central bore 734 at an angle such that the branch bores 738 extend radially outward and axially toward the second end 746. The branch bores 738 intersect the central bore 734 at a common location that is axially positioned within the region of the tapping portion 730 that includes the teeth 718 so that the branch bores 738 are in fluid communication with the central bore 734. The branch bores 738 are straight and form an obtuse angle 762 with the central bore 734. The branch bores 738 are open through the tapping portion 730 to provide lubrication to the teeth 718 via apertures 766.

In the example provided there are two branch bores 738 that are diametrically opposite each other and aligned with the channels 758. The apertures 766 are disposed within the channels 758 to provide lubrication directly to the channels 758. In the example provided, the angle 762 formed by the branch bores 738 is at least 135° and the angle 762 can be greater than 150° depending on the length of the tapping portion 730. In the example provided, the branch bores 738 open to the channels 758 at a location within the chamfered region 754. In an alternative configuration, not specifically shown, the branch bores 738 can open to the channels 758 at a location not in the chamfered region 754, i.e., being open in the same axial region of the channels 758 where the teeth 718 would have their full major diameter. In the example provided, the branch bores 738 each have a diameter that is equal to the diameter of the central bore 734 times the square root of two. In other words, $d_1 = d_2 = D_c/\sqrt{2}$, where $d_1$ and $d_2$ are the diameters of the branch bores 738 and $D_c$ is the diameter of the central bore 734. This ratio of diameters provides an equalized area for flow of the lubrication.

In an alternative configuration, not specifically shown, the central bore 734 extends fully through the second end 746, but is plugged by a plug (not shown). The plug (not shown) seals the central bore 734 at the second end 746 to prevent lubrication from exiting through the second end 746. The plug (not shown) terminates within the central bore before the intersection of the branch bores 738 with the central bore 734 so as not to inhibit flow from the central bore 734 to the branch bores 738. The plug (not shown) can be attached within the central bore 734 with any suitable manner, e.g., welded, brazed, adhesive, epoxy, or threaded into the central bore 734.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thread tap comprising:
   a shaft and a plurality of thread tapping teeth disposed at a threading end of the shaft, the shaft including a plurality of passages that extend helically from the threading end to a base end of the shaft opposite the threading end, each passage being open to an exterior of the thread tap through a corresponding exit aperture defined by the threading end,
   wherein sets of the thread tapping teeth are spaced apart by flutes defined by the shaft, and
   wherein each passage is entirely radially inward of a minimum diameter of the thread tapping teeth and the flutes from the corresponding exit aperture to a corresponding inlet aperture that is open through the base end.

2. The thread tap of claim 1, wherein the corresponding apertures are equally spaced apart in a circumferential direction about a central axis of the shaft.

3. The thread tap of claim 1, wherein the corresponding apertures are defined by a terminal end face of the threading end or a tapered end face of the threading end.

4. The thread tap of claim 3, wherein the corresponding apertures are configured to release lubricant in opposite directions from the terminal end face of the threading end toward the thread tapping teeth.

5. The thread tap of claim 3, wherein the thread tapping teeth are disposed axially between the corresponding apertures and the base end of the shaft.

6. The thread tap of claim 1, wherein the base end of the shaft includes a manifold chamber in fluid communication with each passage.

7. The thread tap of claim 1, wherein a helical pitch of the passages is a different pitch than a thread pitch of the thread tapping teeth.

8. The thread tap of claim 1, wherein a helical diameter of the passages is less than a minimum diameter of the thread tapping teeth.

9. The thread tap of claim 1, wherein the flutes extend linearly along the shaft.

10. A thread tap comprising:
a shaft and at least one threadform disposed at a threading end of the shaft, the shaft including a plurality of passages that extend helically from the threading end to a base end of the shaft opposite the threading end, each passage being open to an exterior of the thread tap via a corresponding exit aperture defined by the threading end,
wherein the passages are entirely radially inward of a minimum diameter of the thread tapping teeth throughout an entire length of the threading end that includes the thread tapping teeth, and
wherein the threading end does not include any flutes that define leading cutting edges.

11. The thread tap of claim 10, wherein each passage of the plurality of passages is separate from each other passage of the plurality of passages from the corresponding exit aperture to a corresponding inlet aperture that is open to the exterior of the thread tap through the base end.

12. The thread tap of claim 11, wherein the passages maintain a constant helical diameter centered about a central axis of the shaft.

13. The thread tap of claim 11, wherein the base end includes a frusto-conical surface and manifold groove recessed into the frusto-conical surface and open to an exterior of the thread tap, wherein each corresponding inlet aperture is open to the manifold groove.

14. The thread tap of claim 10, wherein the passages are entirely radially inward of the minimum diameter of the thread tapping teeth throughout an entire length of the shaft.

15. The thread tap of claim 10, wherein the threading end includes a chamfered region that narrows to a diameter that is less than the minimum diameter of the teeth.

16. The thread tap of claim 15, wherein the corresponding exit apertures are open through the chamfered region.

* * * * *